United States Patent

Knox

[15] 3,638,190

[45] Jan. 25, 1972

[54] ADJUSTABLE SOLID-STATE PROGRAM CONTROL FOR TEST SYSTEMS

[72] Inventor: Marion D. Knox, Oklahoma City, Okla.

[73] Assignee: Wayne Electronic Products Company, Oklahoma City, Okla.

[22] Filed: Jan. 8, 1970

[21] Appl. No.: 1,524

[52] U.S. Cl. ....................................340/147 R, 340/147 P

[51] Int. Cl. ....................................H04q 9/00

[58] Field of Search ..................340/147, 166, 146.1; 328/75

[56] References Cited

UNITED STATES PATENTS

| | | | |
|---|---|---|---|
| 3,264,612 | 8/1966 | Yetter | 340/147 P |
| 3,350,688 | 10/1967 | Kasper et al. | 340/166 |
| 3,445,639 | 5/1969 | Martens | 340/147 X |
| 3,484,745 | 12/1969 | Sourgens | 340/146.1 |
| 3,493,715 | 3/1970 | Bigowsky et al. | 328/75 X |

*Primary Examiner*—Donald J. Yusko
*Attorney*—Dunlap, Laney, Hessin & Dougherty

[57] ABSTRACT

Apparatus for performing automatic control of carrier systems which apparatus consists of solid-state circuitry utilizing no moving parts and which performs program timed operations as between a master transmitting and receiving carrier system and one or more remotely disposed transmitting and receiving carrier units. The apparatus consists of a time base generator which can provide a selected sequence of outputs for application to control an adjustable program matrix through a series of carrier control functions. Outputs from the programmable matrix are then applied to selected components of the carrier system to effect the desired control functions at the proper times.

11 Claims, 4 Drawing Figures

INVENTOR
MARION D. KNOX

BY
Dunlap, Laney, Hessin & Dougherty
ATTORNEYS

INVENTOR
MARION D. KNOX

BY
Dunlap, Laney, Hessin & Dougherty
ATTORNEYS

INVENTOR
MARION D. KNOX

BY
Dunlap, Laney, Hessin & Dougherty
ATTORNEYS

ADJUSTABLE SOLID-STATE PROGRAM CONTROL FOR TEST SYSTEMS

BACKGROUND OF THE INVENTION

1. Field of the Invention

The invention relates generally to automatic carrier testing systems and, more particularly, but not by way of limitation, it relates to solid-state apparatus for use in effecting automatic control of such testing systems.

2. Description of the Prior Art

Testing and checkout of carrier systems has traditionally been carried out by manual or semiautomatic methods wherein one or more men disposed at the variously located high-voltage transmission terminals caused switch actuations in predetermined order or sequence to prove verity of the carrier system. The prior methods were always dependent upon at least one person's presence for actuation and carrying out of the test functions and, even at that, such prior test procedures were somewhat limited as to the possible findings and proofs to be obtained. A U.S. Pat. No. 3,414,773 assigned to the present assignee by the present inventor, teaches a relay carrier testing circuit which is fully automatic to perform numerous tests of the carrier system, viz carrier send, carrier receive, reduced power send and receive, alarm presence, etc., and all of the tests are effected mutually exclusively for each terminal of a system. While the prior art would also include a great many electronic timing systems utilizing various forms of time base generator functioning with plural timing circuits and output selection means, there is no such circuitry known to applicant which can perform the function of variably timing and controlling a carrier test system through a preset sequence of operations.

SUMMARY OF THE INVENTION

The present invention contemplates a static or solid-state control system for repetitively controlling in sequence a plurality of operational functions of a carrier system. In a more limited aspect, the invention is directed to a solid-state device for controlling functions of a carrier test system in monitoring the condition of high-voltage line surveillance equipment between two or more terminal stations. The solid-state circuitry consists of time base circuitry including initiation circuitry and time delay circuitry functioning with time base drive circuitry in the form of a diode matrix. Sequentially derived outputs from the diode matrix at specific time intervals are then applied to a programmable matrix which is programmed in accordance with a predetermined control function to effect selected actuations such as carrier key, reduced power transmission, auxiliary carrier control, alarm test, etc., to ascertain the correct operational disposition of the carrier system and, therefore, the protective relay equipment.

Therefore, it is an object of the present invention to provide static circuitry for automatically controlling carrier systems.

It is also an object of the present invention to provide automatic carrier test circuitry having no moving parts and which is economical, reliable of service, and faster in operation.

It is still further an object of the present invention to provide static control circuitry for powerline carrier testing which is adjustable in time as to a plurality of test functions.

Finally, it is an object of the present invention to provide a static programmer which is readily programmable to provide any of a plurality of different signal outputs.

Other objects and advantages of this invention will be evident from the following detailed description when read in conjunction with the accompanying drawings which illustrate the invention.

DETAILED DESCRIPTION OF THE PREFERRED EMBODIMENT

Figure 1:
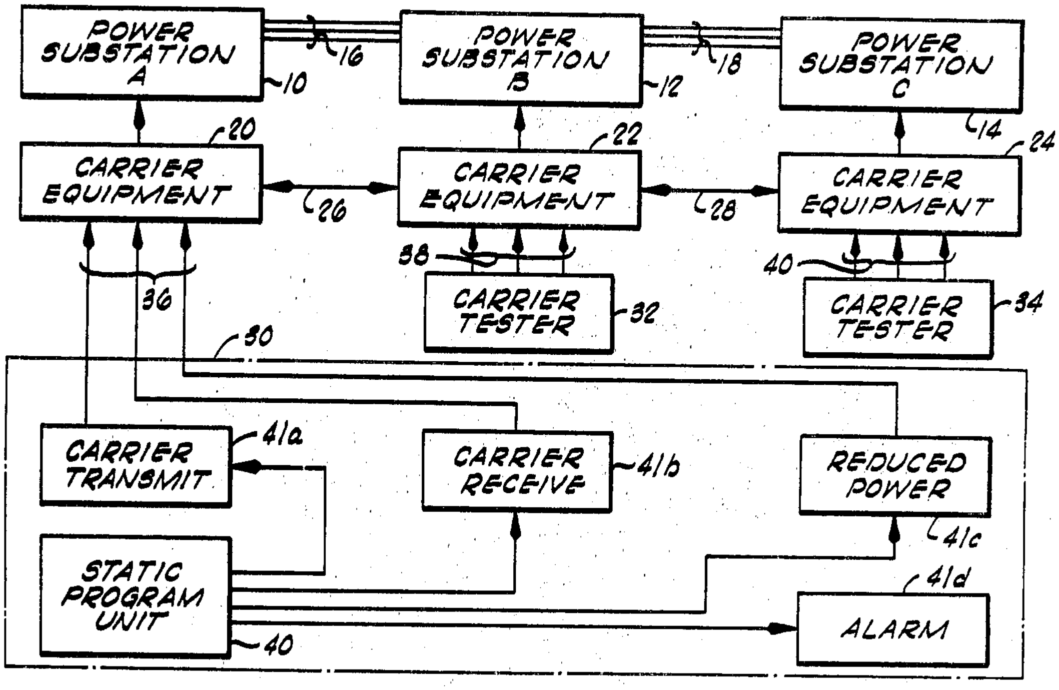
FIG. 1 is a block diagram of a power transmission system utilizing associated carrier equipment and carrier tester circuitry affixed thereto.

Referring first to FIG. 1, the block diagram illustrates a typical three-terminal powerline network which might be utilized with the program circuit of the present invention. The network consists of spaced power substations 10, 12 and 14 which are interlinked by the respective three-wire high-voltage distribution lines 16 and 18. This is a typical form of power distribution, although in many instances a two-terminal linkage or branch may constitute a complete terminal system. Also, typically, the power substations 10, 12 and 14 may be provided with well-known protective equipment as monitored in known manner by carrier equipments 20, 22 and 24 operating through respective power substations 10, 12 and 14. The carrier equipments 20, 22, and 24 may then be serially interconnected by suitable carrier lines such as 26 and 28 to enable high-speed indication of faults or other condition along the particular protected section (the three-terminal extent as indicated) of the power transmission network. In addition, it is usual that the carrier equipments 20, 22 and 24 be used in auxiliary fashion to send and receive other data; e.g., telephony, telemetering, supervisory signals, and various other forms of pertinent information incident to the proper maintenance of the power transmission line may be conveyed therealong.

One of carrier testers 30, 32 and 34 is connected via respective control leads 36, 38 and 40 to each of carrier equipments 20, 22 and 24 in order to carry out the specified test functions so that the condition and status of carrier equipments, as well as power substations 10, 12 and 14, is periodically monitored. Thus, carrier testers 30, 32 and 34 are automatically actuated to carry out a programmed sequence of send and receive carrier functions.

Each of carrier testers 30, 32 and 34 is essentially the same structure and, as shown with respect to carrier tester 30, this structure consists of various control components for actuation in response to a controlled program. The carrier tester 30 includes a static program unit 40 which provides the basic initiation and timing of the carrier tester 30. Static program unit 40 may be connected as shown to each of a carrier transmit control stage **41*a*, a carrier receive control stage 41*b*, a reduced power stage 41*c* and an alarm stage 41*d*. The interactions of the control stages and associated circuitry, and the control actuation by static program unit 40**, will be further discussed below.

Figure 2:
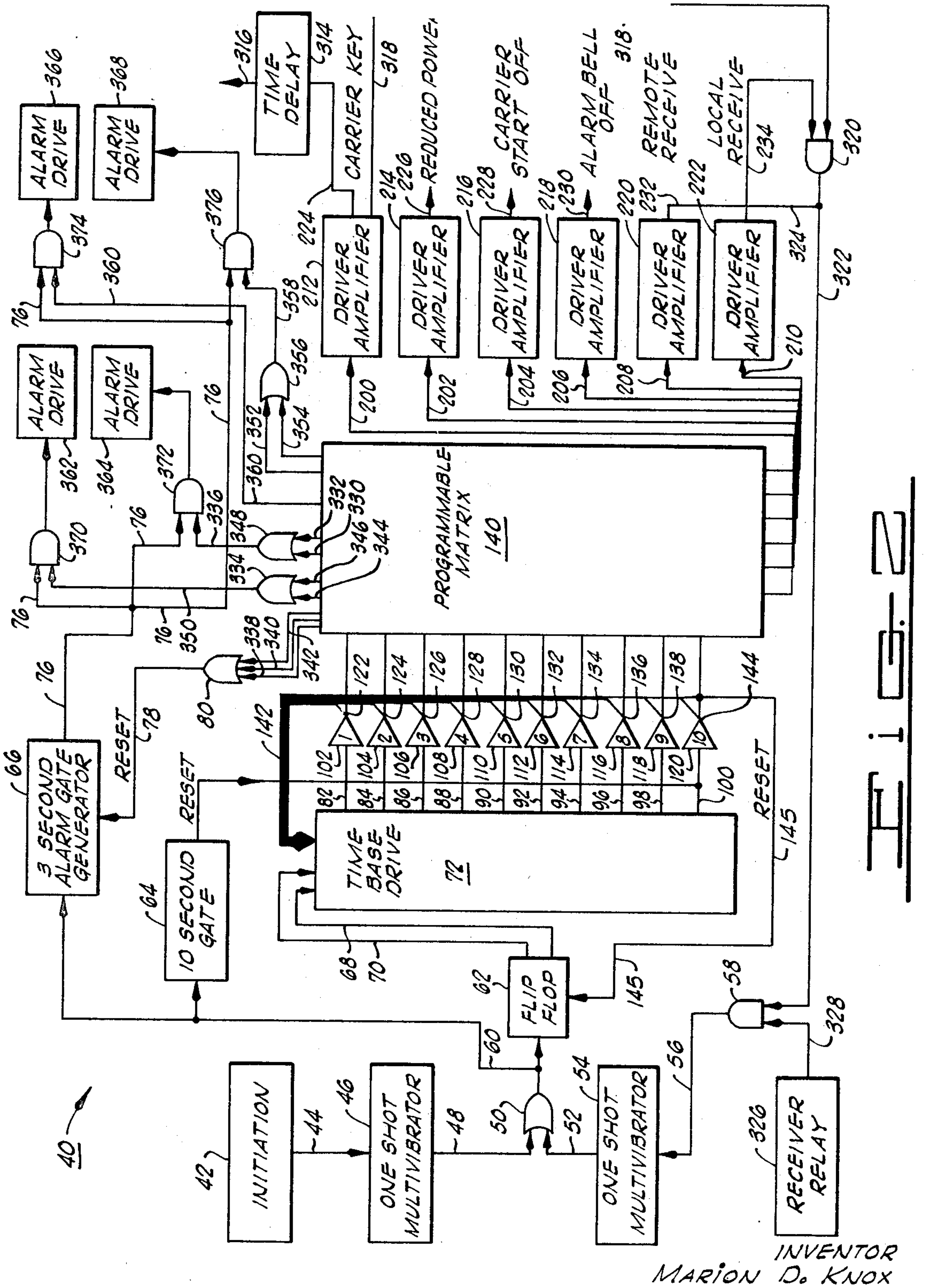
FIG. 2 is a block diagram of static program circuitry constructed in accordance with the present invention.

Referring now to FIG. 2, the static program unit 40 consists of various stages for effecting controlled actuation as between the particular terminal, or carrier equipment and power substation where it is situated, and another selected terminal with which it is in circuit for completion and return indication of the selected test functions. An initiation stage 42 provides input via line 44 to energize a one-shot multivibrator 46 to cause it to change conductive states with output being applied on lead 48 to one input of an OR-gate 50. The remaining gate input is energized by input on lead 52 in response to change in conductive states of one-shot multivibrator 54 as controlled by trigger input on lead 56 from an AND-gate 58. AND-gate 58 is utilized to provide an output only upon indication of some received energy, either local or remote transmitter energy, as will be further described below.

The output from OR-gate 50 then present on a lead 60 which is applied in parallel to a flip-flop stage 62, a 10-second gate generator 64, and a 3-second alarm gate generator 66. Flip-flop 62 provides alternating output on leads 68 and 70 for driving a time base drive 72 as will be further described below. Ten-second gate generator 64 may be such as a conventional form of time delay multivibrator which is energized to change conductive states for a delayed period, in this case 10 seconds, after which it reverts to its quiescent condition. Similarly, the 3-second alarm gate generator 66 may be a conventional multivibrator stage which provides a 3-second square wave output of selected polarity on lead 76. The reset to 3-second alarm gate generator 66 is via lead 78 from OR-gate 80, as will be further described.

The time base drive 72 consists of a selected form of diode matrix which provides sequential pulse output on each of leads 82, 83, 86, 88, 90, 92, 94, 96, 98 and 100 to the respective amplifiers 1 through 10, i.e., amplifiers 102, 104, 106, 108, 110, 112, 114, 116, 118 and 120. Outputs from amplifiers 102 through 120 are applied via leads 122, 124, 126, 128, 130, 132, 134, 136, 138 and 144 for input to a programmable matrix 140 and parallel connection of each of leads 122 through 144 is fed back for input to time base drive 72 (as denoted by heavy line 142). The output from the last amplifier 120 is also routed via lead 145 as a reset input for application to flip-flop 62, as will be further described below.

Figure 3:
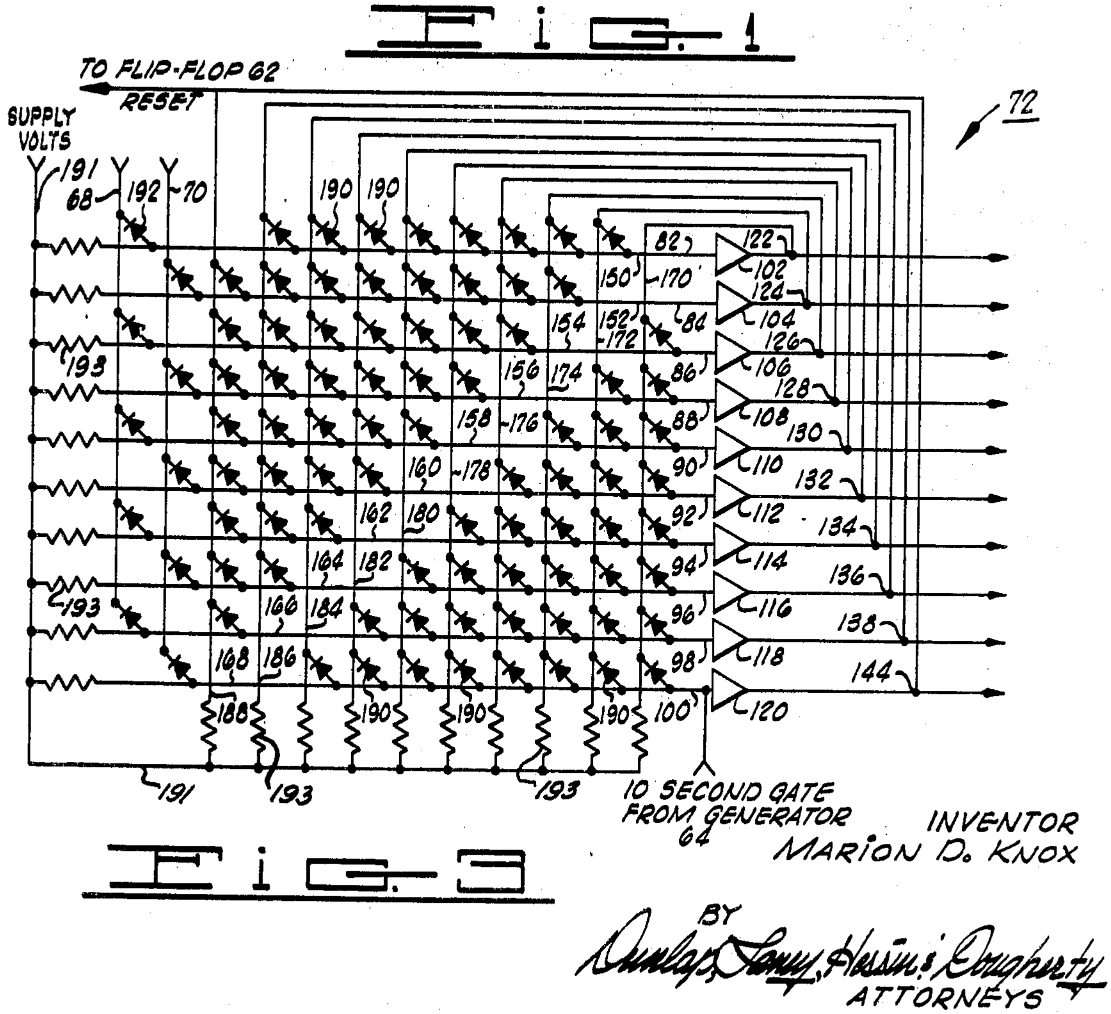
FIG. 3 is a schematic diagram of a time base drive as utilized in the circuitry of FIG. 2.

Referring now to FIG. 3, the time base drive 72 is shown in greater detail. Time base drive 72 consists of a diode matrix constructed with a plurality of horizontal conductors 150, 152, 154, 156, 158, 160, 162, 164, 166 and 168 overlaid in rectangular matrix form by a plurality of vertical conductors 170, 172, 174, 176, 178, 180, 182, 184, 186, and 188. The horizontal conductors 250 through 168 are connected to each of respective amplifier input leads 82 through 100, and the amplifier output leads 122 through 138 are coupled back as feedback input connection at the respective vertical conductors 170, through 188.

A plurality of matrix diodes, designated generally as diodes 190, are connected across node points of the matrix in a particular manner to enable the desired step output. Thus, it may be noted that there are no diodes 190 connected at each of a pair of successively, vertically displaced nodes, such vacancies extending from the upper right-hand corner to the lower left-hand corner of the matrix. This lack of connection at the designated nodes serves to effect the proper amplifier enablement as will be further described. The energizing supply voltage is applied to a lead 191 which then connects through each of a plurality of resistors 193 to respective horizontal conductors 150 through 168 and vertical conductors 170 through 188.

Flip-flop input at leads 68 and 70 is arranged such that alternate inputs will cause alternate energization through the diode matrix. Thus, a positive going voltage on lead 68 will provide input through a diode 192 with conduction along horizontal conductor 150 and input lead 82 to energize amplifier 102. Output from lead 122 is then applied back to vertical conductor 170 which is connected, through the plurality of diodes 190 disposed vertically therealong, to hold at cutoff each of amplifiers 106 through 120. The next succeeding amplifier 104 is held cutoff by the alternate negative flip-flop output voltage applied on lead 70 through a diode 190 connected to the horizontal lead 152 and input lead 84 to amplifier 104. Thus, as count output succeeds with successive energization of amplifier 102 through 120 the respective energized amplifier is controlled by one flip-flop input (at leads 68 or 70), while the next succeeding amplifier is held cutoff by the alternate flip-flop output, and the remaining amplifiers are all held cutoff by feedback applications from the output of the energized amplifier. The steps then proceed in accordance with the rate or occurrence of flip-flop operation until energization of the last amplifier 120 in the matrix whereupon reset output is applied on lead 144. The reset is a feedback connection back to the left side diode vertical connector 188 and to flip-flop 62.

Figure 4:
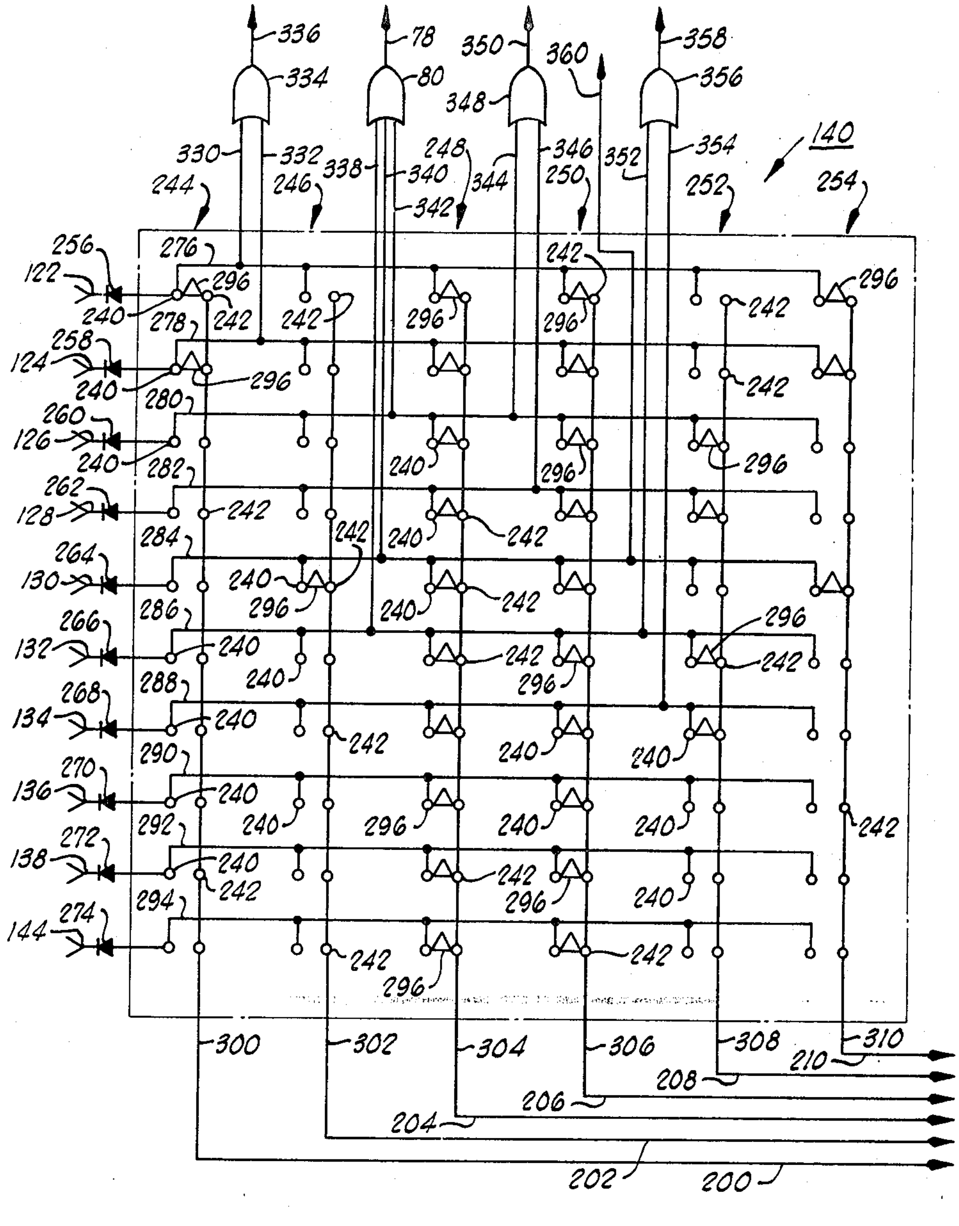
FIG. 4 is a schematic diagram of a programmable matrix as may be utilized in the circuitry of FIG. 2.

The respective output leads 122 through 138 are then applied to the programmable matrix 140 which is programmed in accordance with the desired functions to be performed. The programmable matrix 140, shown also in FIG. 4, provides a plurality of outputs 200, 202, 204, 206, 208 and 210 to each of respective driver amplifiers 212, 214, 216, 218, 220 and 222. Each of driver amplifiers 212 through 222 provide respective outputs 224, 226, 228, 230, 232 and 234 which then provide specified test functions as will be further described below.

Referring more particularly to FIG. 4, programmable matrix 140 consists of a row and column array of contact points. Thus, the array consists of six vertical columns of 10 input contacts 240, each disposed adjacent a counterpart output contact 242. To restate, the matrix consists of six vertical columns 244, 246, 248, 250, 252 and 254 of shortable contact pairs, 10 shortable contact pairs per column, and such contacts pairs consisting of left side contacts 240 and right side contacts 242 (i.e., left and right relative to FIG. 4). Input to the matrix is then applied through leads 122 through the lead 144 from the time base drive 72 for application through a plurality of respective input diodes 256, 258, 260, 262, 264, 266, 268, 270, 272 and 274, and each of the input diodes is connected to respective horizontal row conductors 276, 278, 280, 282, 284, 286, 288, 290, 292 and 294. Each of the respective horizontal row conductors 276 through 294 is connected in turn to each of the left side contacts 240 across its respective horizontal row.

Matrix selection for desired output sequencing is then made by shorting between the contacts 240 and 242 at the desired nodal points by means of shorting contacts 296 in order to effect the proper sequencing of outputs. Shorting contacts 296 may be formed as easily manipulatable conductive segments. Output is then derived from those right side contacts 242 which are in short connection, output being through selected vertical conductors 300, 302, 304, 306, 308 and 310 which connect to respective output leads 200 through 210. The output leads 200 through 210 are then each connected to a respective driver amplifier 212 through 222 (FIG. 2) to produce the various control outputs. Referring again to FIG. 2, driver amplifier 212 provides output 224 to suitable "Carrier Key" circuitry, to be further described, which may control the carrier equipment at the particular terminal. For example, as shown in FIG. 1, "Carrier Key" output 224 may be applied to the carrier transmit control stage **41*a*. In like manner, driver amplifier 214 via output 226 is applied to control "Reduced Power" circuitry such as reduced power stage 41*c* of FIG. 1. Each of driver amplifiers 216, 218, 220 and 222 provides control output on leads 228, 230, 232 and 234 for controlling Carrier Start Off," "Alarm Bell Off," "Remote Receive," and "Local Receive," respectively. By way of example then, the control outputs 224 through 234** may be applied in the manner and to circuitry such as that disclosed in the aforementioned U.S. Pat. No. 3,414,773, assigned to the present assignee.

The output 224 may be routed through an adjustable time delay 314 which generates a delay output 316. Time delay 315 is preferably an adjustable stage variable up to 1-second delay time to provide operation pacing as will be described below. Driver amplifier 212 provides yet another output on a lead 318 to an AND-gate 320 which also receives input from "Local Receive" output 234. Upon coincidence of inputs to AND-gate 320 an output is generated on lead 322 to AND-gate 58 which provides enablement for energization of one-shot multivibrator 54. The output from the "Remote Receiver" output lead 232 is also paralleled via a jumper 324 to provide similar enablement via lead 322 to AND-gate 58. A receiver relay 326, which is energized upon detection of receiver operation to provide an output, applies such receiver verification output via lead 328 to the remaining input of AND-gate 58.

Referring again to FIG. 4 for primary connections and FIG. 2 for block connections, additional timing and control circuitry of the system will be described hereafter. In FIG. 4, a pair of matrix output leads 330 and 332 connected to respective horizontal leads 276 and 278 are applied as input to an OR-gate 334 with output provided via lead 336. Three matrix output leads 338, 340, and 342 are connected to respective horizontal leads 280, 284, and 286 for input to an OR-gate 80 with its characteristic output available on a lead 78. Additional matrix output via leads 344 and 346, from respective horizontal conductors 280 and 282, are applied to OR-gate 348 with output on lead 350; and matrix leads 352 and 354 from respective horizontal conductors 286 and 288 function through OR-gate 356 to provide an output on lead 358. Still another output is provided via lead 360 which is connected from matrix horizontal conductor 284.

Referring again to FIG. 2, the aforementioned OR-gate outputs may be variously applied to control certain local and remote full power and reduced power testing and alarm indications. Thus, when employed in the manner of aforementioned U.S. Pat. No. 3,414,773, alarm drive stages 362, 364, 366 and 368 may be utilized to energize suitable forms of alarm indicators to denote alarm conditions relative to "local full power," "remote full power," "local reduced power," and "remote reduced power," respectively. The alarm drives 362 through 368 may consist of simple transistor driver stages each energizable in response to output from respective AND-gates 370, 372, 374 and 376. Thus, one input to each of AND-gates 370 through 376 is the lead 76 from 3-second alarm generator 66 while remaining inputs to each of AND-gates 370 through 376 are derived from the various OR-gate circuits energized from programmable matrix 140. Thus, output 350 from OR-gate 348 is supplied to AND-gate 370 and, similarly, OR-output lead 336, matrix output lead 360, and OR-output lead 358 are each applied as additional inputs to AND-gates 372, 374 and 376, respectively.

OPERATION

Operation is described hereafter with respect to automatic surveillance circuitry of the type disclosed in aforementioned U.S. Pat. No. 3,414,773, there being several closely related system types; however, it should be understood that the solid-state programming circuitry is by no means limited to this particular application. It is quite probable that circuitry such as the static program unit 40 may find very many used in such as railroad switch control circuitry, numerous radio transmission and telemetry monitor functions, traffic control circuit applications, and many present day applications requiring time-controlled outputs of variable nature for use in surveillance and verification procedures.

The initiation stage 42 may consist of an automatic cycling or timing device which provides periodic output on lead 44 to energize one-shot multivibrator 46 through OR-gate 50. Output from OR-gate 50 via lead 60 is applied to start 3-second alarm generators 66 as well as the count of 10-second generators 64, and it also triggers flip-flop 62 to start time base drive 72. As shown in FIG. 3, alternate flip-flop inputs on leads 68 and 70 serve to shift energization of respective amplifiers 102 through 120 to provide successive outputs on leads 122 through 144. Considering the cyclic nature of the array, energization of each amplifier in the succession which, in turn, is disabled by the alternate flip-flop input at leads 68 and 70. That is, when one of leads 68 and 70 serves to carry the conductive input to cause operational energization of a selected amplifier, the remaining input of leads 68 and 70 will be at the opposite conductive state to cause cutoff of the next amplifier in the succession.

Thus, each time flip-flop 62 is energized due to output from OR-gate 50, the time base drive 72 will shift its output to energize the next amplifier in the amplifier string, amplifiers 102 through 120. An output from the amplifiers via outputs 122 through 144, depending upon which is energized, is applied to respective ones of the input diodes 256 through 274 (FIG. 4) of programmable matrix 140. The programmable matrix 140 provides a variation of control outputs in accordance with the manner in which a plurality of shorting contacts 296 are inserted with respect to the columns of input contacts 240 and their respective output contacts 242. Shorting contacts 296 are placed in accordance with a preselected program plan.

Thus, as the matrix is indicated in FIG. 4, input lead 122 to horizontal lead 276 is shorted at columns 244, 248, 250 and 254 to provide output on respective vertical leads 300, 304, 306 and 310. These outputs are applied to leads 200, 204, 206 and 210, the outputs for "Carrier Key," "Carrier Start Off," "Alarm Bell Off" and "Local Receive," respectively. The placement of the shorting contacts 296 in programmable matrix 140, as indicated, is for specific adaptation in a carrier equipment testing system, and it should be understood that various contact shorting arrangements may be placed in the matrix for whatever the requirements of the use application.

In addition to the matrix outputs which carry out assorted test functions through leads 200 through 210 as connected to driver amplifiers 212 through 222, additional outputs are applied through OR-gates 334, 80, 348 and 356 as well as matrix output lead 360 to control the various alarm drive stages 362 through 368. Coaction of circuit function is such that the various desired test functions of the system may be enabled by the successive pulse applications to inputs 122 through 144 of programmable matrix 140.

The first time that OR-gate 50 is actuated to provide a pulse output on lead 60 to actuate flip-flop 62, 10-second generator 64 is actuated to provide a reset output which will effect reset of time base drive 72 within a predetermined interval if it has not otherwise been returned to its initial cycle position. Output on lead 60 also actuates the 10-second alarm generator 66 which provides a 3-second pulse output on lead 76 to hold the respective AND-gates 370 through 376 disabled for the predetermined period of time. The AND-gates 370 through 376 may then be further actuated by OR-gate responses as derived from programmable matrix 140. For example, with input on leads 122 to programmable matrix 140 if "Carrier Key" output is provided on lead 200 and "Local Receive" output is enabled on lead 210, and yet receiver relay 326 is not receiving energy and not energized to provide the necessary AND input to AND-gate 58, one-shot multivibrator 54 will not be further actuated. Without such further actuation, the continuing of input at lead 122 to programmable matrix 140 for greater than a 3 -second delay will see 3-second alarm generator 66 provide actuating or enabling output on lead 76 and, since output from horizontal lead 276 (programmable matrix 140) is applied through OR-gate 334 to AND-gate 370, the coincidence of inputs will actuate alarm drive 362. Each of the respective alarm AND-gates 370, 372, 374, and 376 is actuated in similar manner when input from the programmable matrix 140 exceeds 3 seconds (or such selected reset time delay) and lead 76 is raised to the actuating voltage level.

The time delay 314, which is energized in response to actuation of driver amplifier 212, provides a means for slowing down the overall circuit actuation and stepping sequence. This is desirable due to the fact that certain of the test outputs require time for relay actuation and stepping sequence. This is desirable due to the fact that certain of the test outputs require time for relay actuation and other circuit setups. Thus, while the static program unit 40 can run through its sequence in considerably less than 10 seconds, it is sometimes desirable to limit the minimum time to a matter of several seconds, rather than to have it proceed in fractions of a second as it is fully capable of doing. The usage of time delay 314 will depend upon the general application for which static program unit 40 is employed.

The foregoing discloses a novel programming device which is capable of performing predetermined tests or sequencing operations within selected time intervals. The static program unit is fully capable of application in various testing, monitoring, transmission or telemetry systems, but it finds particular adaptability and usage in automatic carrier and relay system testing circuitry as is disclosed fully herein.

It should be understood that while certain aspects of the circuitry are disclosed with limitations as to size and and number, the functional components are fully expandable to different configurations. Thus, while the time base drive unit and programmable matrix are generally designated as rectangular decade arrays, these devices can be augmented or reduced as to matrix size in whatever manner particular circuit applications might require.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A static programming system for generating a predetermined number of output control indications in a preselected sequence of occurrence, comprising:

time base drive means having a plurality of sequentially selectable outputs and being energizable to provide pulse output in sequence at said sequentially selectable outputs, said time base drive means including matrix means consisting of a rectangular array of column conductors and row conductors wherein said row conductors each connect to the input of a respective output amplifier and said output amplifiers are each connected to provide a feedback output to respective ones of said column conductors, and a plurality of diodes are connected between respective row column conductors at selected points where such row and column conductors cross in said rectangular array, and further including an additional pair of column conductors diode-connected to alternate ones of said row conductors;

actuation means to shift said time base drive means periodically to produce said pulse output at selected one of said sequentially selectable outputs;

matrix means consisting of plural rows and plural columns of conductors, each of said rows being connected to one of said sequentially selectable outputs from said time base drive means, and each of said columns being connected to provide a respective control output;

plural shorting contact means each being connected between a selected matrix row and a selected matrix column to provide predetermined conductive routing through said matrix means in circuit with selected ones of said matrix means control outputs;

plural control means each connected to one of said matrix means control outputs, each of said control means generating a control indication in response to energization of the respective control output; and means responsive to selected ones of said control indications to actuate said actuation means to shift said time base means pulse output to the next sequential output.

2. A static programming system as set forth in claim 1 wherein said matrix means and plural shorting contact means are further characterized in that:

said matrix means consists of plural columns of input contacts each disposed adjacent to an associated output contact, and a plurality of said shorting contact means manually disposed in conductive relationship between selected ones of said input contact and associated output contact.

3. A static programming system as set forth in claim 2 which is further characterized to include:

plural diodes, each of said diodes being connected between one of said time base drive means selectable outputs and a respective one of said rows of conductors.

4. A static programming system as set fort in claim 1 wherein said actuation means comprises:

flip-flop circuit means energizable to provide two alternating shift outputs for application to said time base drive means.

5. A static programming system as set forth in claim 1 wherein said means responsive to selected ones of said control indications includes:

gate means which may be enabled to receive a control indication from a selected one of said plural control means to provide actuating output to said actuation means.

6. A static programming system as set forth in claim 1 which is further characterized to include:

alarm means connected to said matrix means energizable to provide alarm indication; and circuit means connected to receive a selectable output from the time base drive means as it is connected to said matrix means row conductors and to energize said alarm means if said selectable output is received for greater than a preset time.

7. A static programming system as set forth in claim 6 wherein said circuit means comprises:

gate generator means providing a square wave output of preset time duration upon each actuation of said actuation means; and AND-gate means receiving as inputs said square wave output as disabling input for said duration and said selectable output from the time base drive means as an enabling input.

8. A static programming system as set forth in claim 7 wherein said actuation means comprises:

flip-flop circuit means energizable to provide two alternating shift outputs for application to said time base drive means.

9. A static programming system as set forth in claim 6 which is further characterized to include:

a plurality of said alarm means and respective circuit means each connected to different ones of said matrix row conductors.

10. A static programming system as set forth in claim 1 which is further characterized to include:

means connecting the final one of said selectable outputs from said time base drive means to said actuation means as a reset input to place said actuation means at a prestart condition.

11. A static programming system as set forth in claim 10 which is further characterized to include:

time gate generator means providing a reset output after a preset time duration, said reset output being connected to said actuation means as said reset input.

* * * * *

PO-1050
(5/69)

UNITED STATES PATENT OFFICE
CERTIFICATE OF CORRECTION

Patent No. 3,638,190 Dated January 25, 1972

Inventor(s) Marion D. Knox

It is certified that error appears in the above-identified patent and that said Letters Patent are hereby corrected as shown below:

Column 3, line 10 "83" should be --84--

Column 3 line 26 "250" should be --150--

Column 4 line 51 "315" should be --314--

Column 5 line 37 "used" should be --uses--

Column 5 line 53 after "amplifier" insert the following --functions through the matrix to cause disabling of all remaining amplifiers with the exception of the next amplifier--.

Signed and sealed this 22nd day of August 1972.

(SEAL)
Attest:

EDWARD M.FLETCHER,JR.
Attesting Officer

ROBERT GOTTSCHALK
Commissioner of Patents